United States Patent
Chen et al.

(10) Patent No.: US 9,832,554 B2
(45) Date of Patent: Nov. 28, 2017

(54) MAGNETIC FLOATING LOUDSPEAKER

(71) Applicant: FOXCONN INTERCONNECT TECHNOLOGY LIMITED, Grand Cayman (KY)

(72) Inventors: Hui-Cheng Chen, New Taipei (TW); Jui-Kuang Chung, New Taipei (TW); Chung-Hung Chen, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 28 days.

(21) Appl. No.: 14/957,124

(22) Filed: Dec. 2, 2015

(65) Prior Publication Data
US 2016/0157002 A1  Jun. 2, 2016

(30) Foreign Application Priority Data
Dec. 2, 2014  (TW) .............................. 103141702 A

(51) Int. Cl.
| | |
|---|---|
| *H04R 1/02* | (2006.01) |
| *H02J 7/02* | (2016.01) |
| *H02N 15/00* | (2006.01) |
| *H04R 1/24* | (2006.01) |

(52) U.S. Cl.
CPC .............. *H04R 1/025* (2013.01); *H02J 7/025* (2013.01); *H02N 15/00* (2013.01); *H04R 1/028* (2013.01); *H04R 1/24* (2013.01); *H04R 2420/07* (2013.01)

(58) Field of Classification Search
CPC .......... H04R 1/025; H04R 1/028; H04R 1/24; H04R 2420/07; H02J 7/025; H02N 15/00
See application file for complete search history.

(56) References Cited

U.S. PATENT DOCUMENTS

| | | | | |
|---|---|---|---|---|
| 4,961,226 A | * | 10/1990 | Saffran ..................... | H04R 1/02 381/303 |
| 7,348,691 B2 | * | 3/2008 | Davis ..................... | A63H 33/26 104/284 |

(Continued)

FOREIGN PATENT DOCUMENTS

| | | |
|---|---|---|
| TW | M473861 | 3/2014 |
| TW | I433423 | 4/2014 |
| TW | M486920 | 9/2014 |

OTHER PUBLICATIONS

Seifeirt; "This wireless speaker floats on a cloud of magnetic force"; Aug. 12, 2014; The VERGE.*

*Primary Examiner* — David Ton
(74) *Attorney, Agent, or Firm* — Wei Te Chung; Ming Chieh Chang

(57) ABSTRACT

A magnetic floating speaker includes a seat having a shell and a magnetic floating controller and a lower magnet both received in the shell. A floating member floating and located above the seat has a cover, a bass unit, two full range units and an upper magnet all received in the cover. The magnetism of the upper magnet and the lower magnet is mutually exclusive. The bass unit is surrounded by said two full range units and faces to a first direction, said two full range units face to a second direction and a third direction respectively which located at two sides of the first direction, the second direction and the third direction each forms an acute angle with the first direction respectively.

13 Claims, 5 Drawing Sheets

(56) References Cited

U.S. PATENT DOCUMENTS

| | | | | |
|---|---|---|---|---|
| 8,912,686 B2* | 12/2014 | Stoner, Jr. | ............... | H02J 5/005 307/104 |
| 2008/0279406 A1* | 11/2008 | D'Hoogh | ............. | H04R 1/2811 381/332 |
| 2010/0215203 A1* | 8/2010 | Sip | ........................... | H04R 5/04 381/386 |
| 2011/0194720 A1* | 8/2011 | Bergere | ................... | H04R 1/24 381/332 |
| 2012/0319647 A1* | 12/2012 | Itabashi | ............ | H02M 3/33553 320/108 |
| 2015/0349571 A1* | 12/2015 | Wagman | ................. | H02J 50/90 320/108 |

* cited by examiner

MAGNETIC FLOATING LOUDSPEAKER

FIELD OF THE INVENTION

The present invention relates to a magnetic floating loudspeaker.

DESCRIPTION OF THE PRIOR ART

Most traditional loudspeakers are placed on a table, and the loudspeaker transfers a sound from a controller or a player through a cable connection. These intricate cables are difficult to clean and very easy to be pulled accidentally. Furthermore, the loudspeaker placed on the table will produce standing wave interference, and the sound field will become narrow, and this will weaken the sound effect.

T.W. Patent No. M486920 discloses a floating bluetooth loudspeaker. The floating bluetooth loudspeaker includes a carrier and a seat located above the carrier. The seat includes a speaker set up vertically, so that a sound of the floating bluetooth loudspeaker spreads in a single upward direction. When many people locates at different positions for sharing the floating bluetooth loudspeaker at the same time, everyone will hear a different sound. Only someone in front of a sound direction where the sound spreads from will enjoy a bass sound.

It is desired to obtain an improved loudspeaker.

SUMMARY OF THE INVENTION

Accordingly, an object of the present invention is to provide a magnetic floating speaker with a good sound effect.

In order to achieve the object set forth, a magnetic floating speaker includes a seat having a shell and a magnetic floating controller and a lower magnet both received in the shell. A floating member floating above the seat has a cover, a bass unit, two full range units and an upper magnet all received in the cover. The magnetism of the upper magnet and the lower magnet is mutually exclusive. The bass unit is surrounded by said two full range units and faces to a first direction, said two full range units face to a second direction and a third direction respectively which located at two sides of the first direction, the second direction and the third direction each forms an acute angle with the first direction respectively.

DESCRIPTION OF PREFERRED EMBODIMENT

Reference will now be made to the drawings to describe the present invention in detail.

Referring to FIGS. 1-5, a magnetic floating loudspeaker 100 includes a seat 2 placed on a table and a floating member 1 floating and located above the seat 2. The seat 2 includes a plurality of positioning feet 262 supported by the table in order to reserve a space for easily moving the seat 2.

Figure 1:
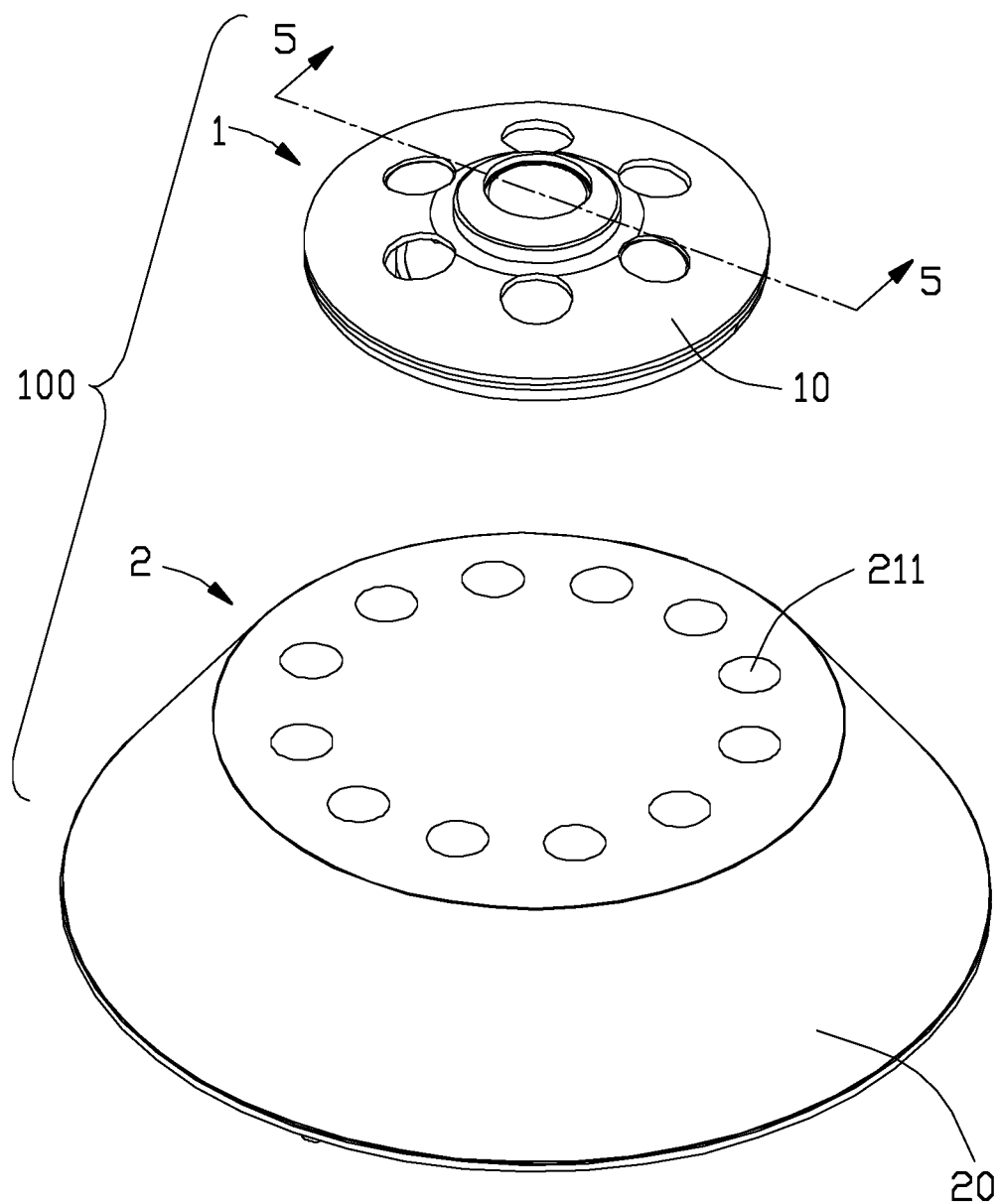
FIG. 1 is a perspective view of a magnetic floating loudspeaker in accordance with the present invention.
Figure 2:
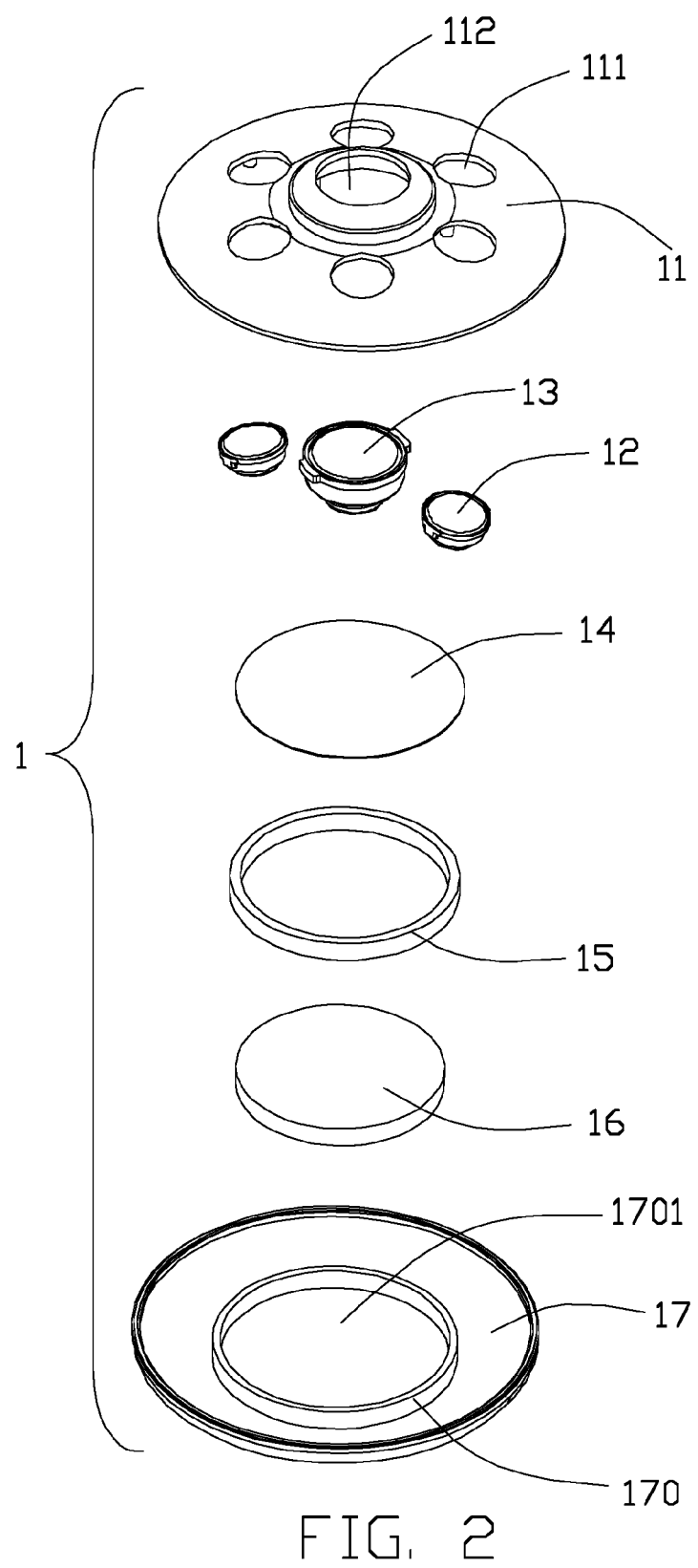
FIG. 2 is an exploded perspective view of a floating member of the magnetic floating loudspeaker in accordance with the present invention.
Figure 5:
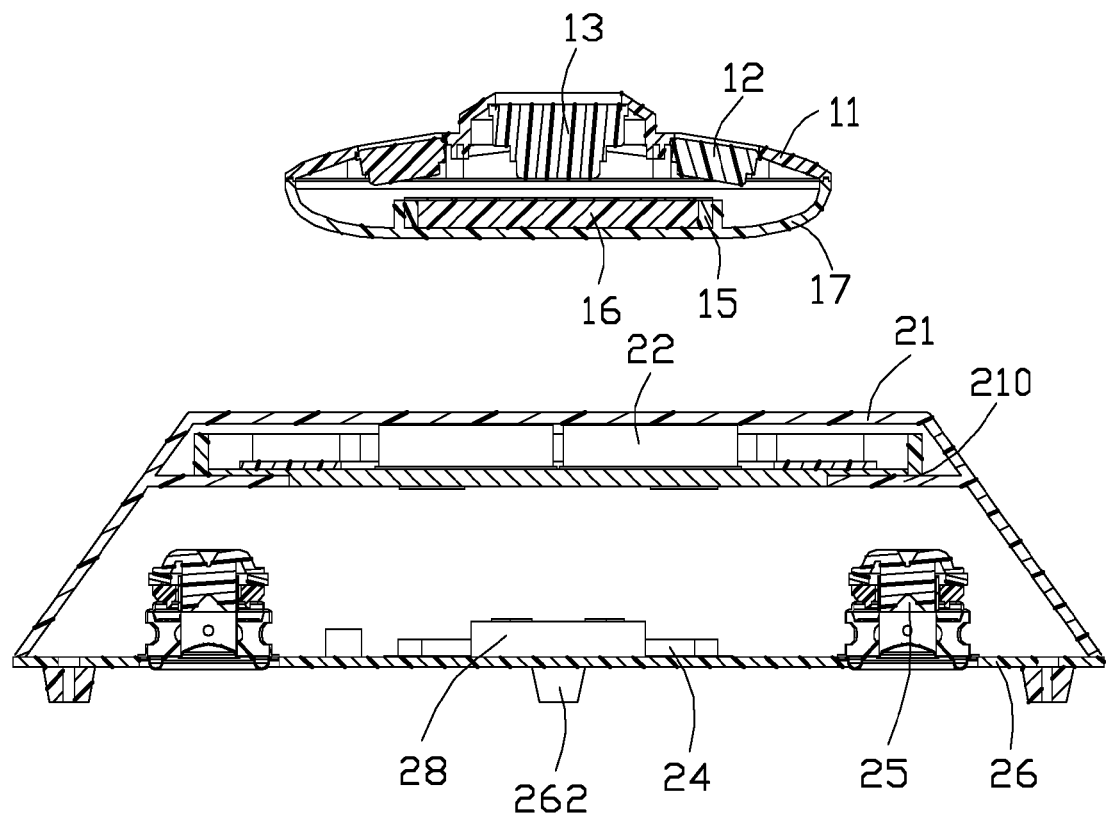
FIG. 5 is a cross-sectional view of FIG. 1 taken along line 5-5.

Referring to FIGS. 1-2, the floating member 1 includes a cover 10 and a bass unit 13, at least two full range units 12, a circuit board 14, a wireless charging receiver 15 and an upper magnet 16 all received in the cover 10. The cover 10 includes an upper cover 11 and a lower cover 17 assembled to the upper cover 11. The bass unit 13 and the two full range units 12 are fixed in the upper cover 11. The upper cover 11 includes a first hole 112 and a plurality of second holes 111 surrounding the first hole 112. The bass unit 13 exposes from the first hole 112 located above the bass unit 13. Referring to FIG. 5, the full range units 12 expose from the second holes 111 located above the full range units 12 respectively. The full range units 12 surround the bass unit 13 and are set to face different directions. The bass unit 13 is set to face an X direction, and the two full range units 12 are set to face a Y direction and a Z direction respectively. The X direction is defined as a vertically upward direction, and the Y direction and the Z direction each forms an acute angle with the X direction to form an annular sound field. The annular sound field can take advantage of a reflection produced by a spacious closed space to sonic, and this produces a similar sound field in an annular direction, and this also produces a similar sound quality and a similar sound volume in the annular direction. This makes someone surrounding the loudspeaker can hear a similar sound and achieves a purpose of everyone sharing the music. The circuit board 14, the wireless charging receiver 15 and the upper magnet 16 are fixed in the lower cover 17. The lower cover 17 includes an annular rib 170, the annular rib 170 forms a receiving space 1701 for receiving the upper magnet 16, the wireless charging receiver 15 and the circuit board 14. The wireless charging receiver 15 is an annular structure and surrounds the upper magnet 16. The circuit board 14 is set above the wireless charging receiver 15 and the upper magnet 16.

Figure 3:
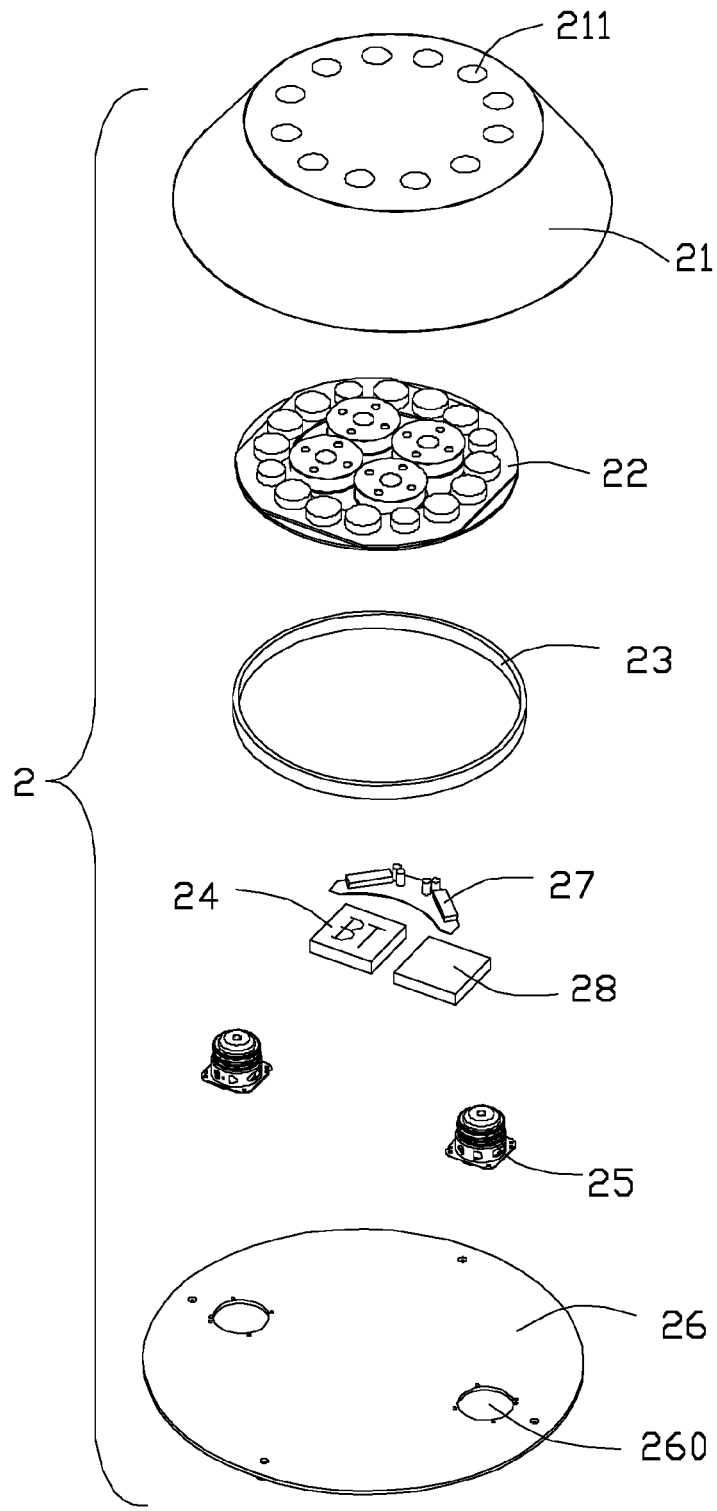
FIG. 3 is an exploded perspective view of a seat of the magnetic floating loudspeaker in accordance with the present invention.
Figure 4:
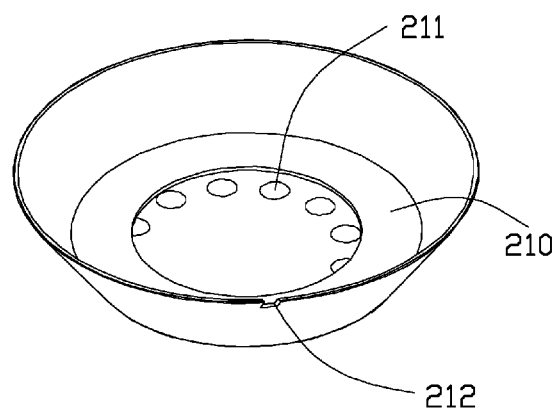
FIG. 4 is a perspective view of a top shell of the seat of FIG. 3.

Referring to FIGS. 1 and 3-4, the seat 2 includes a shell 20 and a mega bass unit 25, a bluetooth module 24, an amplifier 29, a printed circuit board 30 for retaining the bluetooth module 24 and the amplifier 29 together, a magnetic floating controller 27, a wireless charging transmitter 23, an electrical storage device 28 and a lower magnet 22. The amplifier 29 is used for controlling and amplifying a signal of a sound produced by the mega bass unit 25. The magnetism of the upper magnet 16 and the lower magnet 22 are mutually exclusive. The shell 20 includes a top shell 21 and a bottom shell 26 assembled to the top shell 21. The wireless charging transmitter 23 and the lower magnet 22 are fixed in the top shell 21. The top shell 21 has a supporting portion 210 for supporting the wireless charging transmitter 23 and the lower magnet 22. The wireless charging transmitter 23 is an annular structure and surrounds the lower magnet 22. The mega bass unit 25, the bluetooth module 24, the amplifier 29, the printed circuit board 30 and the magnetic floating controller 27 are fixed in the bottom shell 26. The bottom shell 26 defines a hole 260 located above the mega bass unit 25, and the mega bass unit 25 can expose from the hole 260. The top shell 21 defines a gap 212 for a connection with an external electrical charging device. When the seat 2 is charged, the electrical storage device 28 can store electrical energy from wireless charging for the floating member 1. Even if the seat 2 is separated from an external power source, the magnetic floating loudspeaker 100 of the present invention can still in use. The top shell 21 also includes a light module 211, this makes the magnetic floating loudspeaker 100 has a lighting effect. The circuit board 4 of the floating member 1 is used for controlling a normal use of the bluetooth module 24 and the electrical storage device 28 of the magnetic floating loudspeaker 100.

Referring to FIGS. 1-5, since the magnetism of the upper magnet 16 and the lower magnet 22 are mutually exclusive in use of the magnetic floating loudspeaker 100, the floating member 1 is floating located above the seat 2. The floating member 1 not only has a floating effect, but also occupies no space and has a wider sound field. The magnetic floating controller 27 is used for controlling the floating member 1 floating located above the seat 2 very stably. The floating member 1 includes the bass unit 13 and two full range units 12, and the seat 2 includes the mega bass unit 25, which strengthens the rhythm of the sound and makes the magnetic floating loudspeaker 100 has a very good sound effect. When the wireless charging transmitter 23 of the seat powered on, it produces a magnetic field, and then the floating member 1 floating located above the seat 2 can be charged by the wireless charging transmitter 23, and this achieves a function of wireless charging. The electrical storage device 28 of the seat 2 can store electrical energy when the seat 2 is charging, and the seat 2 can continue to supply electrical energy for the floating member 1, this makes the magnetic floating loudspeaker 100 of the present invention can still be in use after the seat 2 with the power off from the external power source. The magnetic floating speaker 100 can receive an external audio signal through the bluetooth module 24, and the external audio signal is from an electronic device having a bluetooth function.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A magnetic floating speaker comprising:
    a seat having a shell and a magnetic floating controller and a lower magnet both received in the shell; and
    a floating member floating and located above the seat, the floating member having a cover, a bass unit, two full range units and an upper magnet all received in the cover, magnetisms of the upper magnet and the lower magnet being mutually exclusive to each other;
    wherein the bass unit is surrounded by said two full range units, the bass unit faces to a first direction, said two full range units face to a second direction and a third direction respectively which located at two sides of the first direction, the second direction and the third direction each forms an acute angle with the first direction respectively; and
    wherein the first direction is defined as a vertically upward direction, and the seat has a mega bass unit received in the shell.

2. The magnetic floating speaker as claimed in claim 1, wherein the cover of the floating member has an upper cover and a lower cover assembled to the upper cover, the bass unit and the full range units are fixed in the upper cover, the upper magnet is fixed in the lower cover.

3. The magnetic floating speaker as claimed in claim 2, wherein the upper cover defines a first hole located above the bass unit and a plurality of second holes located above the full range units respectively, the first hole are surrounded by the second holes, the bass unit exposes from the first hole and the full range units expose from the second holes respectively.

4. The magnetic floating speaker as claimed in claim 2, wherein the lower cover has an annular rib, the annular rib forms a receiving space for receiving the upper magnet.

5. The magnetic floating speaker as claimed in claim 1, wherein the shell of the seat has a top shell and a bottom shell assembled to the top shell, the lower magnet is fixed in the top shell, the mega bass unit and the magnetic floating controller are fixed in the bottom shell, the bottom shell defines a hole for exposing the mega bass unit.

6. The magnetic floating speaker as claimed in claim 5, wherein the top cover has a supporting portion for supporting and fixing the lower magnet.

7. A magnetic floating speaker comprising:
    a seat having a shell and a wireless charging transmitter, a magnetic floating controller and a lower magnet all received in the shell;
    a floating member floating and located above the seat, the floating member having a cover and an upper magnet and a wireless charging receiver both received in the cover, magnetisms of the upper magnet and the lower magnet is mutually exclusive to each other; wherein a magnetic field is provided by the seat and the floating member is charged by the wireless charging transmitter;
    wherein the floating member has a bass unit and two full range units received in the cover, the bass unit is surrounded by said two full range units, the bass unit is set to face a vertically upward direction, said two full range units are set to face another two directions, each of the another two directions forms an acute angle with the vertically upward direction respectively; and
    wherein the seat has a mega bass unit received in the shell.

8. The magnetic floating speaker as claimed in claim 7, wherein the seat has an electrical storage device which can stores electrical energy after being charged.

9. The magnetic floating speaker as claimed in claim 7, wherein the wireless charging receiver is an annular structure and surrounds the upper magnet, the wireless charging transmitter is an annular structure and surrounds the lower magnet.

10. The magnetic floating speaker as claimed in claim 7, wherein the cover of the floating member has an upper cover and a lower cover assembled with the upper cover, the bass unit and the full range units are fixed in the upper cover, the upper magnet and the wireless charging receiver are fixed in the lower cover.

11. The magnetic floating speaker as claimed in claim 10, wherein the lower cover has an annular rib, the annular rib forms a receiving space, the upper magnet and the wireless charging receiver are received in the receiving space.

12. The magnetic floating speaker as claimed in claim 7, wherein the shell of the seat has a top shell and a bottom shell assembled with the top shell, the lower magnet and the wireless charging transmitter are fixed in the top shell, the magnetic floating controller is fixed in the bottom shell.

13. The magnetic floating speaker as claimed in claim 12, wherein the top shell has a supporting portion for supporting and fixing the lower magnet and the wireless charging transmitter.

* * * * *